(12) United States Patent
Kleijn et al.

(10) Patent No.: US 7,572,840 B2
(45) Date of Patent: Aug. 11, 2009

(54) METHOD FOR PRODUCING SUPERABSORBING POLYMERS

(75) Inventors: Paul Kleijn, Voorthuizen (NL); Herman Reezigt, Ootmarsum (NL)

(73) Assignee: Vepetex B.V., PB Deurne (NL)

( * ) Notice: Subject to any disclaimer, the term of this patent is extended or adjusted under 35 U.S.C. 154(b) by 13 days.

(21) Appl. No.: 10/959,922

(22) Filed: Oct. 5, 2004

(65) Prior Publication Data

US 2005/0143482 A1 Jun. 30, 2005

(30) Foreign Application Priority Data

Oct. 6, 2003 (NL) .................................. 1024457

(51) Int. Cl.
*C08F 2/46* (2006.01)
*C08J 3/28* (2006.01)

(52) U.S. Cl. .................. 522/182; 522/104; 522/167; 522/168; 522/173; 522/175; 522/178; 522/181; 522/188; 526/263; 526/270; 526/302; 526/304; 526/328; 526/333; 526/930

(58) Field of Classification Search ............... 522/182, 522/104, 84, 86, 167, 168, 173, 175, 178, 522/181, 188; 526/263, 270, 302, 304, 328, 526/333, 930, 178, 181, 188
See application file for complete search history.

(56) References Cited

U.S. PATENT DOCUMENTS

| | | | | |
|---|---|---|---|---|
| 4,892,754 A | * | 1/1990 | Itoh et al. ............. | 427/513 |
| 4,914,170 A | * | 4/1990 | Chang et al. .......... | 526/240 |
| 5,059,664 A | * | 10/1991 | Yada et al. ............ | 526/240 |
| 5,147,956 A | * | 9/1992 | Allen ................... | 526/318.42 |
| 5,633,316 A | * | 5/1997 | Gartner et al. ........ | 525/54.32 |
| 6,403,674 B1 | * | 6/2002 | Schubert ............... | 522/167 |
| 6,565,981 B1 | * | 5/2003 | Messner et al. ....... | 428/441 |
| 7,026,373 B2 | * | 4/2006 | Smith et al. .......... | 522/182 |
| 2004/0203308 A1 | * | 10/2004 | Ko et al. .............. | 442/352 |

FOREIGN PATENT DOCUMENTS

| | | |
|---|---|---|
| EP | 0 290 814 A2 | 11/1988 |
| EP | 0 312 952 A2 | 4/1989 |
| WO | WO 98/52979 A1 | 11/1998 |

OTHER PUBLICATIONS

Pappas. Photoiniation of Radical, Cationic, and Concurrent Radical-Cationic Polymerization. taken from New Trends in the Photochemistry of Polymers. edited by Allen et al.(1986). pp. 99-111.*
Photopolymerization of Surface Coatings. ed. by Roffey. pp. 67-136.*
Electromagnetic radiation. retrived from on Jun. 23, 2008. Dictionary. Com (unabridged) v 1.1 for Random House. 2006. online from <URL:http//dictionary.reference.com/browse/electromagnetic%20radiation>.*

* cited by examiner

*Primary Examiner*—Sanza L McClendon
(74) *Attorney, Agent, or Firm*—The Webb Law Firm

(57) ABSTRACT

The present invention relates to a method for manufacturing super-absorbent polymers, comprising providing a reaction mixture which comprises at least a first monomer and a second monomer and a radical-forming polymerization initiator, and subsequently causing the monomers to polymerize under the influence of an energy source, wherein radical formation occurs and the polymerization is started, wherein the first monomer is neutralized with an inorganic base before polymerization, in addition to the manufactured super-absorbent polymers. The invention further relates to a method for applying a coating of super-absorbent polymers to a carrier.

22 Claims, 2 Drawing Sheets

U.S. 7,572,840 B2

METHOD FOR PRODUCING SUPERABSORBING POLYMERS

FIELD OF THE INVENTION

The present invention relates to a method for manufacturing super-absorbent polymers, as well as to the polymers manufactured using this method. The invention further relates to a method for applying a coating of super-absorbent polymers to a carrier, the carrier manufactured with this method, and the use thereof.

BACKGROUND OF THE INVENTION

Super-absorbent polymers have already been known for decades. Such super-absorbent polymers can absorb up to many times their own weight in liquid and are used for diverse different applications. Super-absorbent polymers are generally based on acrylamide or acrylic acid as monomer component, which is cross-linked with a small quantity of a cross-linker. At the location where this cross-linker is incorporated there is created a cross-link between the polymer chains, so that a network results. The polymer chains contain a large number of carboxyl (COOH) groups. Through contact with water or an aqueous liquid, hydrogen atoms will be released and negatively charged carboxylate ($COO^-$) groups will be formed. These carboxylate groups are mutually repellent, wherein the cross-linked polymer as it were forms a three-dimensional network in which the water molecules can be captured.

Super-absorbent polymers can be manufactured in diverse ways. U.S. Pat. No. 6,403,674 for instance describes a method for manufacturing super-absorbent polymers wherein there are provided a first monofunctional monomer, such as acrylic acid, and a second multifunctional monomer, which can be dissolved in each other so that no further solvent is required. The monomer components are mixed together, whereafter they are polymerized under the influence of a suitable energy source.

It is known that the absorption capacity of super-absorbent polymers increases further when the polyacrylic acid is neutralized with a base such as NaOH. The sodium ions here neutralize the negatively charged carboxylate groups. A large amount of moisture can be absorbed via osmosis. The sodium ions are herein hydrated, whereby the distance to the carboxylate groups increases. The free carboxylate groups will once again repel each other, whereby the chains will begin to stretch more such that even more space is created for the absorption of extra moisture. Sodium polyacrylate is generally manufactured by neutralizing polyacrylic acid in an aqueous environment, whereafter the water must be removed, as described in for instance WO 98/52979.

Due to the great number and the diversity of possible applications of super-absorbent polymers, there is a continual demand for improved methods of manufacturing super-absorbent polymers with a high absorption capacity.

SUMMARY OF THE INVENTION

The object of the present invention is therefore to provide a simple and efficient method for manufacturing super-absorbent polymers.

This object is achieved with the invention by providing a reaction mixture which comprises at least a first monomer and a second monomer and a radical-forming polymerization initiator, and subsequently causing the monomers to polymerize under the influence of an energy source, wherein radical formation occurs and the polymerization is started, wherein the first monomer is a monomer containing an acrylic acid group with the formula $H_2C=CR_1R_2$, wherein $R_1=H$ or an alkyl group with 1-10 carbon atoms, and $R_2=COOH$, which is completely or partially neutralized with an inorganic base before polymerization. The second monomer is preferably a compound in which the first monomer is at least partly soluble. The first monomer is preferably neutralized substantially completely, but the degree of neutralization of the first monomer partly depends on the solubility of the neutralized first monomer in the second monomer. For process-engineering reasons it is therefore possible to opt for a lower degree of neutralization.

With the method according to the invention super-absorbent polymers which have a high absorption capacity can be manufactured in simple and relatively inexpensive manner. The formed super-absorbent polymers are furthermore very stable, i.e. retain their absorption capacity for a long time, and can readily withstand for instance high temperatures (100-200° C.) which can occur for a short time during treatment processes of the polymers.

The invention also relates to the super-absorbent polymers obtainable using the method as described herein. The super-absorbent polymers obtained with the method according to the invention have a very high absorption capacity, (up to more than 100 times their own weight, and even more than 200 times their own weight, such as 225 times their own weight), are more stable than the polymers manufactured in conventional manner (see Example 2) and in addition have film-forming properties.

For diverse applications of super-absorbent polymers it is known to apply these to a carrier. Partly due to its simplicity and efficiency, the method for manufacturing super-absorbent polymers according to the invention is very suitable for applying such polymers to a carrier. Super-absorbent polymers are moreover formed with film-forming properties. These can be applied on a carrier very readily without for instance adhesives being required.

The invention therefore also relates to a method for applying a coating of super-absorbent polymers to a carrier, comprising of impregnating the carrier with a reaction mixture comprising at least one monomer containing a first acrylic acid group and neutralized with an inorganic base, with the formula $H_2C=CR_1R_2$, wherein $R_1=H$ or an alkyl group with 1-10 carbon atoms, and $R_2=COOH$, which monomer is neutralized before polymerization, a second monomer and a radical-forming polymerization initiator, and causing the monomers to polymerize on the carrier under the influence of an energy source wherein radical formation occurs and the polymerization is started. With the method according to the invention the super-absorbent polymers can be applied to a carrier in simple but very efficient manner, wherein a stable super-absorbent action is achieved. Drying of the formed polymers is not necessary.

DETAILED DESCRIPTION OF THE PREFERRED EMBODIMENTS

According to the invention the acrylic acid group of the first monomer is neutralized to the salt thereof using an inorganic base. Diverse inorganic bases are suitable for this purpose. The inorganic base is preferably composed of elements from group 1 or 2 of the periodic system of elements, such as for instance NaOH, as well as of other monovalent cations such as the ammonium ion. When acrylic acid is for instance neutralized with caustic soda, the sodium salt of acrylic acid is formed.

According to a subsequent particular preferred embodiment of the invention, the second monomer is a compound selected from:
- a monomer containing an acrylic acid group and having the formula $H_2C=CR_3R_4$, wherein $R_3=H$ or an alkyl group with 1-10 carbon atoms and $R_4$ is an alkyl carboxyl group with 1-10 carbon atoms and not equal to $R_2$, as defined above;
- a monomer containing an acrylamide group and having the formula $H_2C=CR_3CONHR_5$, wherein $R_3$ is as defined above and $R_5$ is an alkyl group with 1-10 carbon atoms;
- a compound selected from methoxy(polyethylene glycol)-methacrylate, ammonium sulphate ethyl methacrylate, triethylene glycol divinyl ether, 1,4-cyclohexane dimethanol divinyl ether, vinyl acetate, N-vinyl-2-pyrrolidone, N-vinyl-N-methylacetamide, vinyl cyanide, crotonic acid, 3-amino-crotonamide. The second monomer provides the option of varying the physical properties of the formed polymer. Thermoplastic polymers are formed by making use of such monofunctional monomers, whereby the polymers can be further processed in simple manner. In addition, the first monomer in neutralized form is at least partly soluble in such monofunctional monomers, and polymers with film-forming properties can be obtained with these selections of the second monomer.

The second monomer is preferably chosen from the group consisting of N,N dimethyl acrylamide, N-isopropyl acrylamide, diacetone acrylamide. Alternatively, the second monomer is preferably selected from the group of 4-hydroxybutyl acrylate, 4-hydroxybutyl methacrylate, hydroxypropyl acrylate, hydroxypropyl methacrylate, hydroxyethyl acrylate or hydroxyethyl methacrylate. As alternative, the second monomer is preferably selected from the group of methoxy(polyethylene glycol)-methacrylate or ammonium sulphate ethyl methacrylate. Alternatively, the second monomer is preferably selected from the group of methoxy(polyethylene glycol)-methacrylate, ammonium sulphate ethyl methacrylate, triethylene glycol divinyl ether, 1,4-cyclohexane dimethanol divinyl ether, vinyl acetate, N-vinyl-2-pyrrolidone, N-vinyl-N-methyl acetamide, vinyl cyanide, crotonic acid, 3-amino-crotonamide. These monomers are liquid in the reaction conditions prevailing in the polymerization step, or easily form a solution with the first monomer. An (aqueous) solvent is hereby no longer necessary for the polymerization, so that the drying step after polymerization can be omitted and considerable time and cost are saved.

The super-absorbent polymer according to the invention preferably comprises a molecular ratio of the second monomer to the first monomer of 1:1 or less, such as 1:2 or 1:3 or 1:5. At this weight ratio the formed super-absorbent polymer has favourable mechanical properties and advantageous rheological behaviour. The quantity of the second monomer must however be sufficient to dissolve the first monomer adequately at the degree of neutralization used.

According to a further preferred embodiment of the invention, the reaction mixture further comprises a cross-linker. The cross-linking is important for the action of the super-absorbent polymer because, in the case of free polymer chains, these would dissolve in liquid instead of absorbing it. It must be noted that with determined selections of the second monomer the addition of a cross-linker is not essential to achieve the desired result. This is for instance the case if hydroxybutyl acrylate is selected as the second monomer. It will be understood that the cross-linker can be selected subject to the base used, the desired properties of the polymer, etc. Suitable cross-linkers have a functionality equal to or higher than two, such as glycol diacrylate or methylene bisacrylamide. The super-absorbent polymer preferably comprises a molecular ratio of cross-linker relative to the total number of monomers of 1:1000 to 1:10, such as 1:100.

Other additives can be added to the monomer mixture if desired, such as for instance colouring agents and/or additive substances.

According to the invention the polymerization takes place by exposing the monomers to an energy source wherein radical formation occurs and the polymerization is started due to the presence of the radical-forming polymerization initiator. Diverse energy sources can be used for this purpose, such as for instance gamma radiation and electron radiation. In a very suitable preferred embodiment of the invention, the radical-forming polymerization initiator is a photoinitiator and the polymerization takes place under the influence of UV light. The use of a photoinitiator has the advantage that no spontaneous polymerization occurs in the reaction mixture if it is closed off from light incidence, such as can be the case when for instance peroxides are used. Additionally, the polymerization under the influence of a photoinitiator can be initiated immediately using the correct electromagnetic radiation. This in contrast to polymerization initiation using peroxides under the influence of a temperature increase, which always takes some time. The photoinitiator preferably comprises an aryl ketone group and is soluble in the reaction mixture, such as for instance 2-hydroxy-2-methyl-1-phenylpropanone, 2,4,6-trimethylbenzoyl diphenyl phosphinoxide, or mixtures thereof.

In an effective preferred embodiment of the invention, the pH is held in the range of 4.5 to 5.5 during the neutralizing step. This prevents the mixture becoming solid at room temperature.

The invention further relates to a carrier obtainable with the above described method. According to the invention the carrier can be embodied in diverse forms and materials, depending on the eventual application of the super-absorbent material. The carrier can for instance be manufactured from a plastic (for instance polyester), or from a natural material such as wool or cotton. The carrier can consist of (continuous) fibres or of yarns etc. The carrier can further also comprise metal wire, such as for instance copper wire.

It will be appreciated that the carrier as described above can be used for diverse, very different applications where the use of super-absorbent materials is desired, such as among others as sealing material for taps or as fire-resistant coating. In addition, application is possible as absorbent material in incontinence products, including diapers. In a general sense the carrier can thus be applied for the absorption of a water-containing medium. A water-containing medium should here also be understood to mean a medium which consists substantially of water. In a preferred embodiment of the invention, the carrier is used as coating material in electrical energy and communication cables in order to protect the cables against penetration of water into the core.

BRIEF DESCRIPTION OF THE DRAWINGS

The method for applying a coating of super-absorbent polymers to a carrier is further elucidated on the basis of the examples and figures.

As shown in FIG. 1, in which a suitable arrangement for the method according to the invention is shown, a thread-like carrier 1 (for instance yarn) is unrolled from a spool 2 and guided through an immersion bath 3 with the reaction mixture. The reaction mixture for instance comprises a first monomer neutralized with NaOH and a second monomer and a photoinitiator. The impregnated yarn is then irradiated with UV light under a lamp housing 4 with UV radiator 5 and a UV-reflecting mirror 6, wherein polymerization occurs on the yarn. The coated yarn is wound directly onto a second spool 7. Because the monomer mixture comprises practically no solvent, drying is not necessary.

EXAMPLES

Figure 1:
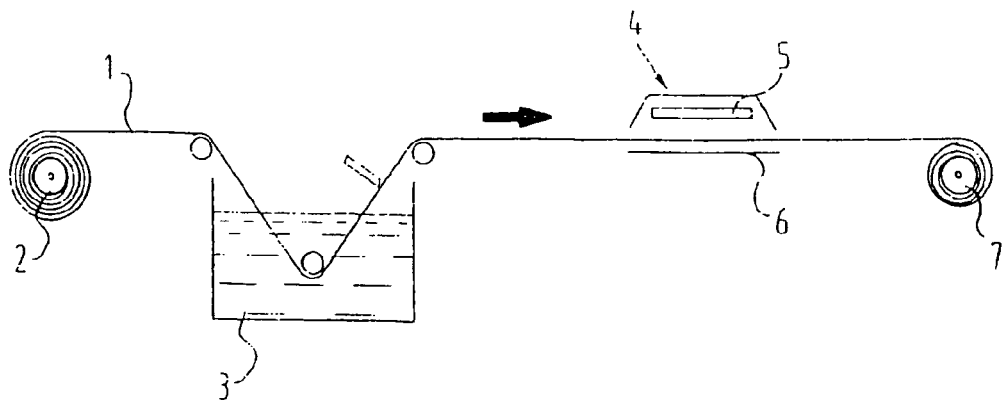
FIG. 1 shows a schematic arrangement for the method for applying a coating of super-absorbent polymers to a carrier according to the invention.

The invention is further illustrated by the following non-limiting examples.

Example 1

Manufacture of Super-Absorbent Acrylic Polymers
  Ingredients:
  90% acrylic acid with 10% water
  hydroxypropyl methacrylate (HPMA)
  caustic soda 50%
  lumilink 400 (broad spectrum photoinitiator; Parvus B.V., Zeewolde, NL)
  water N.B.: The super-absorbent polymer is obtained without the addition of a cross-linker.

Method:

46.5% by weight of acrylic acid (90%) is mixed with 30.7% by weight of HPMA. The mixture is stirred well for at least 10 minutes. 18.6% by weight of caustic soda (50%) is then added slowly, wherein the exothermic reaction is properly monitored. The temperature must be held below 50° C. here. Some increase in temperature is however necessary to obtain a clear solution.

After adding of the caustic soda the mixture is stirred until it has cooled to below 30° C.

1.4% by weight of water is added to keep the mixture fluid, and the mixture is stirred well. A clear mixture is herein obtained.

A photoinitiator is then added, wherein direct sunlight must be avoided. Lumilink is a photoinitiator which forms radicals under the influence of light with a wavelength below 500 nm (UV light). The polymerization of the monomer components starts due to exposure of the reaction mixture to UV light. During the neutralization the pH of the reaction mixture must be held between 4.5 and 5.5.

Example 2

Stability Testing of the Polymers According to the Invention

Absorption Determination:

A pre-weighed quantity of dry yarns coated with the super-absorbent polymers according to the invention or with the absorbent polymers manufactured in conventional manner is placed in 300 ml of distilled water for 2 minutes. The graduated beaker with yarn is poured into a sieve and drained for four minutes. The sieve with the yarn is then weighed again.

The wet weight is herein equal to the total weight—25 grammes (=weight of the sieve).

In order to determine the amount of residual moisture, a determined quantity of wet yarn is then placed on a balance which is situated in a heated drying oven so that the yarn is dried gradually. The weight of the yarn is measured (continuously or at determined moments) until the moment at which decrease in weight no longer occurs.

Table I shows the results for the water absorption determination of diverse production batches of coated yarns. The water-absorbing capacity for the super-absorbent polymer can be determined on the basis of the determination of the water absorption of the yarns. For the different production batches this is on average around 225 ml (225 g) of water per gram of the super-absorbent polymer, which corresponds to a water-absorbing capacity of 22, 500% of the dry weight of the super-absorbent polymer according to the invention.

TABLE I

Test data UV hydrocoat ART. CSP.380

| Batch | Dry weight coated yarn g/m | Wet weight coated yarn g/m | Take-up g/m | Dry coating weight g/m | Absorption ml/gram |
|---|---|---|---|---|---|
| 1 | 0.270 | 8.07 | 7.80 | 0.040 | 195 |
| 2 | 0.270 | 9.26 | 8.99 | 0.040 | 225 |
| 3 | 0.275 | 8.25 | 7.98 | 0.045 | 177 |
| 4 | 0.278 | 9.86 | 9.58 | 0.048 | 202 |
| 5 | 0.278 | 13.48 | 13.20 | 0.048 | 278 |
| 6 | 0.273 | 11.90 | 11.63 | 0.043 | 274 |
| 7 | 0.288 | 13.35 | 13.06 | 0.058 | 227 |

NB: dry yarn weight is 0.23 g/m

Ageing Test:

Super-absorbent yarns according to the invention and conventional yarns (manufactured by polymerizing in aqueous solution, applying the polymer paste to the yarn and then removing the water in an oven) were subjected to an ageing test in order to determine the stability of the super-absorbent yarns.

Figure 2:
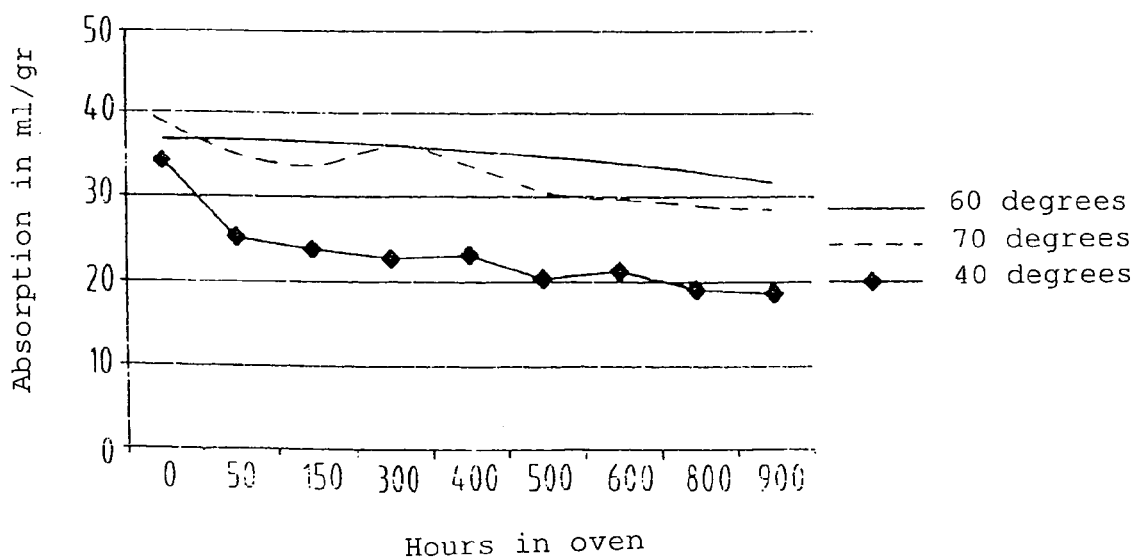
FIG. 2 shows a graph in which the stability of conventional super-absorbent yarns is compared to that of the yarns according to the invention.

The absorption capacity of the conventional yarns was monitored after the yarns had been placed in an oven at 40° C. The absorption capacity of the yarns according to the invention was determined after having been placed in an oven at 60° C., and even 70° C. The results are shown in FIG. 2. As is apparent from FIG. 2, the absorption capacity of the conventional yarns decreases sharply in time at 40° C. Conversely, the absorption capacity of the yarns according to the invention remains stable for a longer time, even when the polymers are exposed to higher temperatures. The super-absorbent yarns manufactured with the method according to the invention are thus clearly more stable than the conventional yarns.

Figure 3:
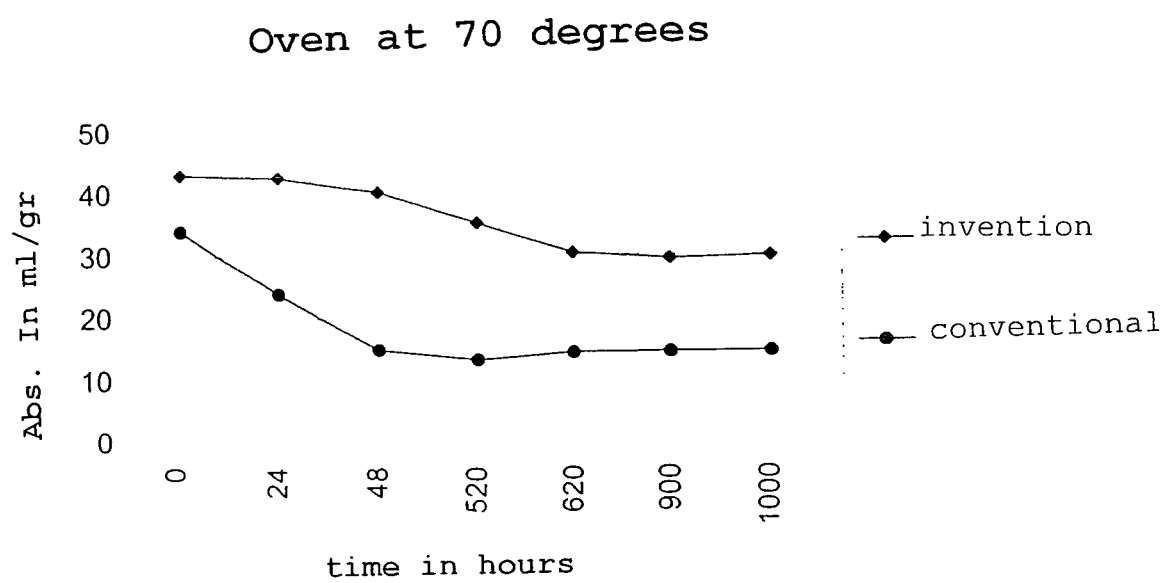
FIG. 3 is a graph in which the stability of conventional super-absorbent yarns is compared to that of yarns according to the invention, both at 70° C.

FIG. 3 shows results of comparable measurements of conventional yarns and yarns according to the invention, both at 70° C. These results also show that the yarns according to the invention are clearly more stable than the conventional yarns.

The invention claimed is:

1. A method for manufacturing super-absorbent polymers, comprising providing a non-aqueous reaction mixture which comprises at least a first monomer and a second monomer and a radical-forming polymerization initiator, and subsequently causing the monomers to polymerize under the influence of an energy source, wherein radical formation occurs and the polymerization is started, wherein the first monomer is a monomer containing an acrylic acid group with the formula $H_2C=CR_1R_2$, wherein $R_1=H$ or an alkyl group with 1-10 carbon atoms, and $R_2=COOH$, wherein the first monomer is neutralized with an inorganic base before polymerization, wherein the radical-forming polymerization initiator consisting essentially of a photoinitiator and polymerization takes place under the influence of UV light, wherein the second monomer is a compound selected from the group consisting of:
- a monomer containing an acrylic acid group and having the formula $H_2C=CR_3R_4$, wherein $R_3=H$ or an alkyl group with 1-10 carbon atoms and $R_4$ is an alkyl carboxyl group with 1-10 carbon atoms and not equal to $R_2$;
- a monomer containing an acrylamide group and having the formula $H_2C=CR_3CONHR_5$, wherein $R_3$ is as defined above and $R_5$ is an alkyl group with 1-10 carbon atoms; and
- a compound selected from the group consisting of methoxy (polyethylene glycol)-methacrylate, ammonium sulphate ethyl methacrylate, vinyl acetate, N-vinyl-2-pyrrolidone, N-vinyl-N-methylacetamide, vinyl cyanide, crotonic acid, 3-amino-crotonamide, N,N dimethyl acrylamide, N-isopropyl acrylamide, diacetone acrylamide, 4-hydroxybutyl acrylate, 4-hydroxybutyl methacrylate, hydroxypropyl acrylate, hydroxypropyl methacrylate, hydroxyethyl acrylate and hydroxyethyl methacrylate.

2. The method as claimed in claim 1, wherein the neutralization of the first monomer takes place in a liquid mixture of the first and second monomer.

3. The method as claimed in claim 1, wherein the second monomer is a compound selected from the group consisting of:
- a monomer containing an acrylic acid group and having the formula $H_2C=CR_3R_4$, wherein $R_3=H$ or an alkyl group with 1-10 carbon atoms and $R_4$ is an alkyl carboxyl group with 1-10 carbon atoms and not equal to $R_2$;
- a monomer containing an acrylamide group and having the formula $H_2C=CR_3CONHR_5$, wherein $R_3$ is as defined above and $R_5$ is an alkyl group with 1-10 carbon atoms; and
- a compound selected from the group consisting of methoxy (polyethylene glycol)-methacrylate, ammonium sulphate ethyl methacrylate, vinyl acetate, N-vinyl-2-pyrrolidone, N-vinyl-N-methylacetamide, vinyl cyanide, crotonic acid, and 3-amino-crotonamide.

4. The method as claimed in claim 3, wherein the second monomer is chosen from the group consisting of N,N dimethyl acrylamide, N-isopropyl acrylamide and diacetone acrylamide.

5. The method as claimed in claim 3, wherein the second monomer is chosen from the group consisting of 4-hydroxybutyl acrylate, 4-hydroxybutyl methacrylate, hydroxypropyl acrylate, hydroxypropyl methacrylate, hydroxyethyl acrylate and hydroxyethyl methacrylate.

6. The method as claimed in claim 3, wherein the second monomer is chosen from the group consisting of methoxy (polyethylene glycol)-methacrylate and ammonium sulphate ethyl methacrylate.

7. The method as claimed in claim 3, wherein the second monomer is chosen from the group consisting of methoxy (polyethylene glycol)-methacrylate, ammonium sulphate ethyl methacrylate, vinyl acetate, N-vinyl-2-pyrrolidone, N-vinyl-N-methyl acetamide, vinyl cyanide, crotonic acid, and 3-amino-crotonamide.

8. The method as claimed in claim 1, wherein the super-absorbent polymer comprises a molecular ratio of second monomer to the first monomer of 1:1 or less.

9. The method as claimed in claim 1, wherein the photoinitiator comprises an aryl ketone group and is soluble in the reaction mixture.

10. A super-absorbent polymer obtainable using the method of claim 1.

11. The super-absorbent polymer of claim 10, wherein the water-absorption capacity amounts to more than 100 times the dry weight of the polymer.

12. The super-absorbent polymer of claim 10, wherein the water-absorption capacity amounts to more than 200 times the dry weight of the polymer.

13. A method for applying a coating of super-absorbent polymers to a carrier, comprising:
- impregnating the carrier with a reaction mixture comprising a first monomer containing a first acrylic acid group, wherein $R^1=H$ or an alkyl group with 1-10 carbon atoms, and $R_2=COOH$, a second monomer that dissolves in the first monomer and a radical-forming polymerization initiator,
- neutralizing the first monomer with an inorganic base having a formula $H_2C=CR_1R_2$, and
- causing the first monomer and the second monomer to polymerize on the carrier under the influence of an energy source wherein radical formation occurs and the polymerization is started, without a drying step, wherein the second monomer is a compound selected from the group consisting of:
- a monomer containing an acrylic acid group and having the formula $H_2C=CR_3R_4$, wherein $R_3=H$ or an alkyl group with 1-10 carbon atoms, and $R_4$ is an alkyl carboxyl group with 1-10 carbon atoms and not equal to $R_2$, as defined above;
- a monomer containing an acrylamide group and having the formula $H_2C=CR_3CONHR_5$, wherein $R_3$ is as defined above and $R_5$ is an alkyl group with 1-10 carbon atoms, and
- a compound selected from methoxy (polyethylene glycol)-methacrylate, ammonium sulphate ethyl methacrylate, vinyl acetate, N-vinyl-2-pyrrolidone, N-vinyl-N-methyl acetamide, vinyl cyanide, crotonic acid, 3-amino-crotonamide, N,N dimethyl acrylamide, N-isopropyl acrylamide, diacetone acrylamide, 4-hydroxybutyl acrylate, 4-hydroxybutyl methacrylate, hydroxypropyl acrylate, hydroxypropyl methacrylate, hydroxyethyl acrylate and hydroxyethyl methacrylate.

14. The method as claimed in claim 13, wherein the neutralization of the first monomer takes place in a liquid mixture of the first monomer and the second monomer.

15. The method as claimed in claim 13, wherein the second monomer is a compound selected from the group consisting of:
- a monomer containing an acrylic acid group and having the formula $H_2C=CR_3R_4$, wherein $R_3=H$ or an alkyl group with 1-10 carbon atoms, and $R_4$ is an alkyl carboxyl group with 1-10 carbon atoms and not equal to $R_2$, as defined above;
- a monomer containing an acrylamide group and having the formula $H_2C=CR_3CONHR_5$, wherein $R_3$ is as defined above and $R_5$ is an alkyl group with 1-10 carbon atoms, and
- a compound selected from methoxy (polyethylene glycol)-methacrylate, ammonium sulphate ethyl methacrylate, vinyl acetate, N-vinyl-2-pyrrolidone, N-vinyl-N-methyl acetamide, vinyl cyanide, crotonic acid, 3-amino-crotonamide.

16. The method as claimed in claim 15, wherein the second monomer is chosen from the group consisting of N,N dimethyl acrylamide, N-isopropyl acrylamide and diacetone acrylamide.

17. The method as claimed in claim 15, wherein the second monomer is chosen from the group consisting of 4-hydroxybutyl acrylate, 4-hydroxybutyl methacrylate, hydroxypropyl acrylate, hydroxypropyl methacrylate, hydroxyethyl acrylate and hydroxyethyl methacrylate.

18. The method as claimed in claim 15, wherein the second monomer is chosen from the group consisting of methoxy (polyethylene glycol)-methacrylate and ammonium sulphate ethyl methacrylate.

19. The method as claimed in claim 13, wherein the super-absorbent polymer comprises a molecular ratio of second monomer to the first monomer of 1:1 or less.

20. The method as claimed in claim 13, wherein the radical-forming polymerization initiator consisting essentially of a photoinitiator and the polymerization takes place under the influence of UV light.

21. The method as claimed in claim 20, wherein the photoinitiator comprises an aryl ketone group and is soluble in the reaction mixture.

22. A carrier provided with a coating of a super-absorbent polymer obtainable with the method as claimed in claim 13.

* * * * *

UNITED STATES PATENT AND TRADEMARK OFFICE
CERTIFICATE OF CORRECTION

PATENT NO.        : 7,572,840 B2                                              Page 1 of 1
APPLICATION NO.   : 10/959922
DATED             : August 11, 2009
INVENTOR(S)       : de Kleijn et al.

It is certified that error appears in the above-identified patent and that said Letters Patent is hereby corrected as shown below:

Cover of the Patent, Item (75) Inventors: "Paul Kleijn" should read
-- Paul de Kleijn --

Signed and Sealed this

Twentieth Day of April, 2010

David J. Kappos
*Director of the United States Patent and Trademark Office*